Figure 1:
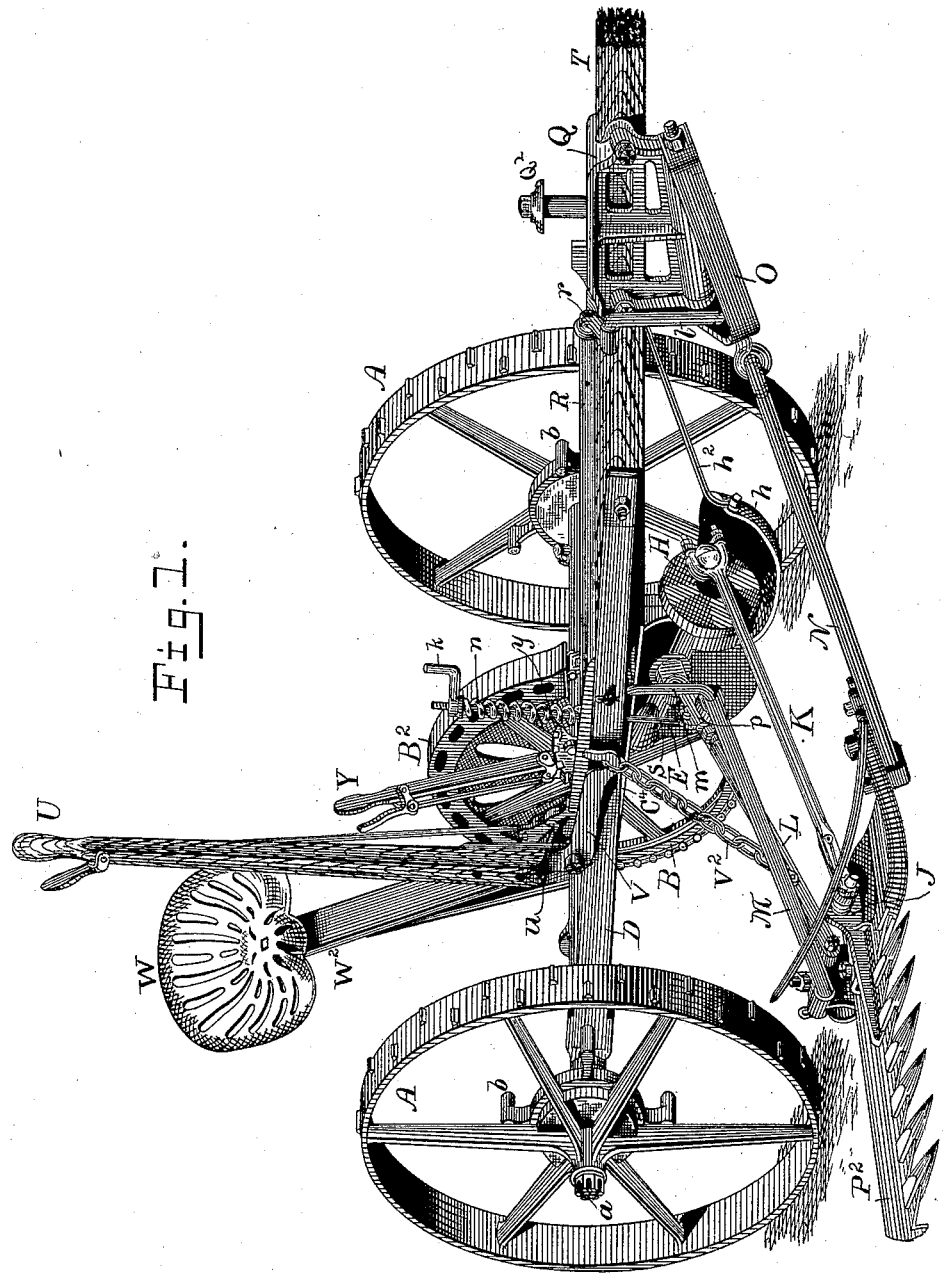

(No Model.) 6 Sheets—Sheet 4.
W. N. WHITELEY & W. BAYLEY.
MOWING MACHINE.
No. 378,816. Patented Feb. 28, 1888.
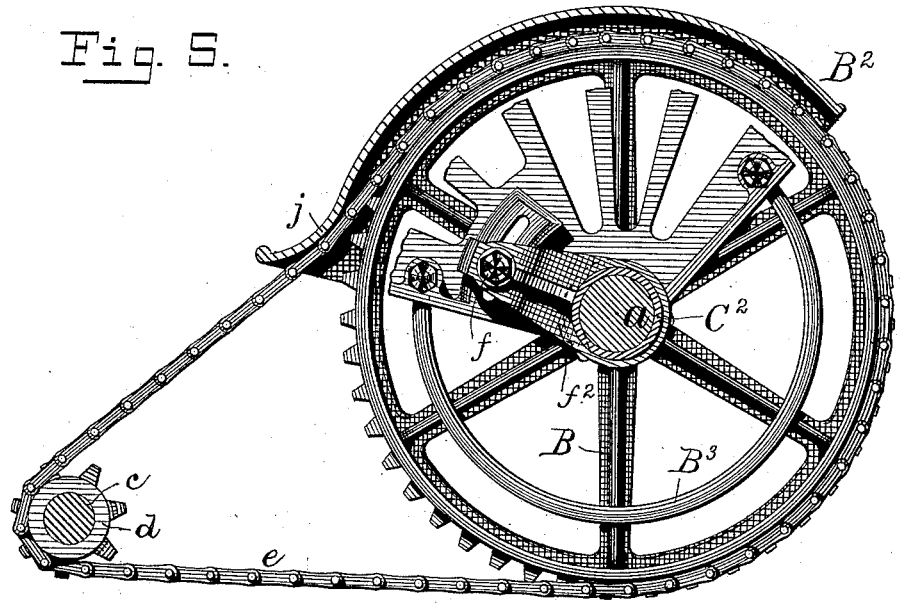
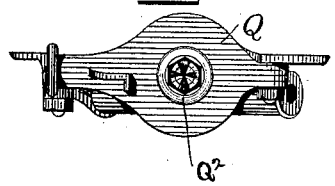
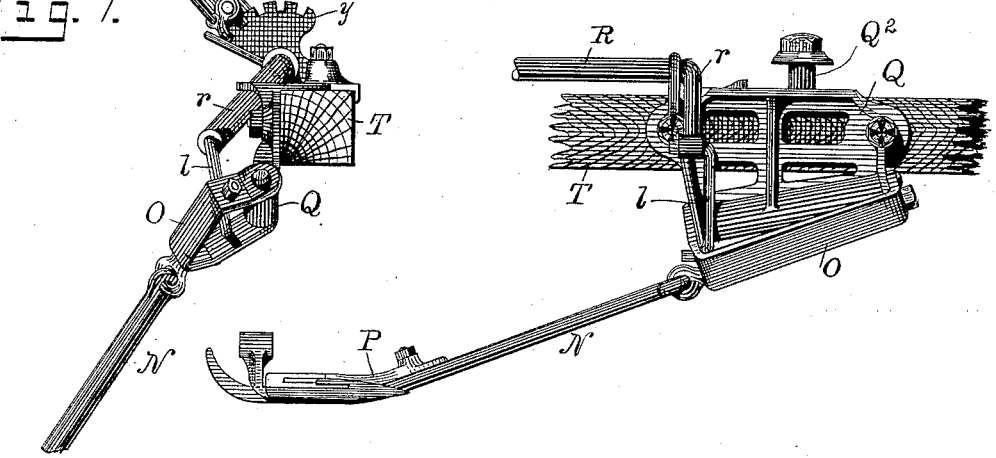
Witnesses:
Oscar E. Perrigo
Fred State
Inventors:
William N. Whiteley
William Bayley

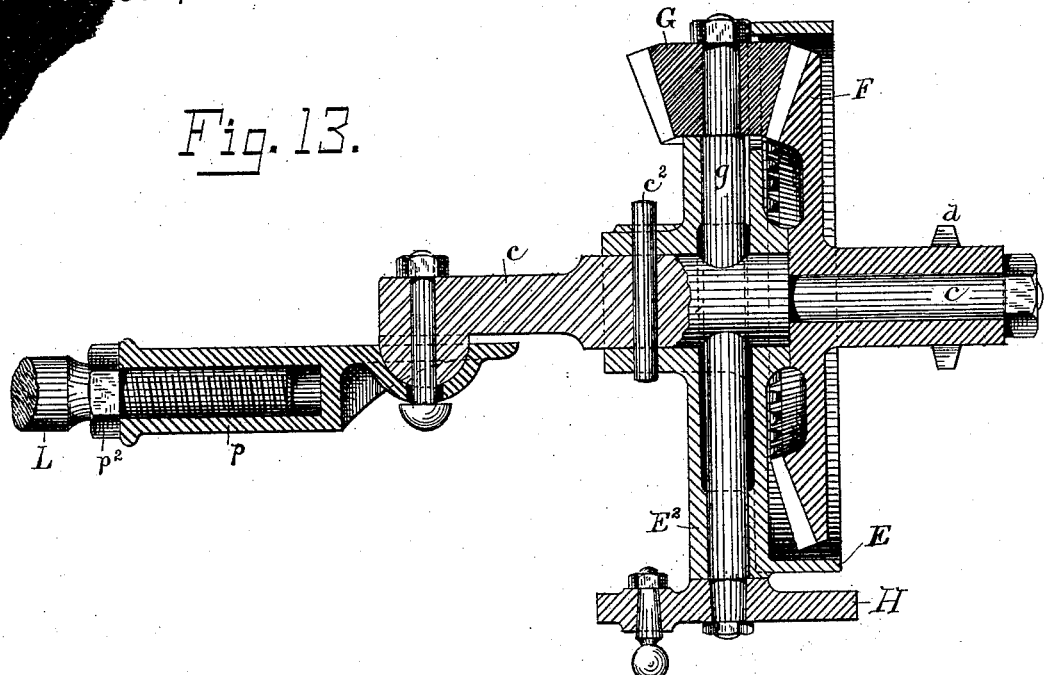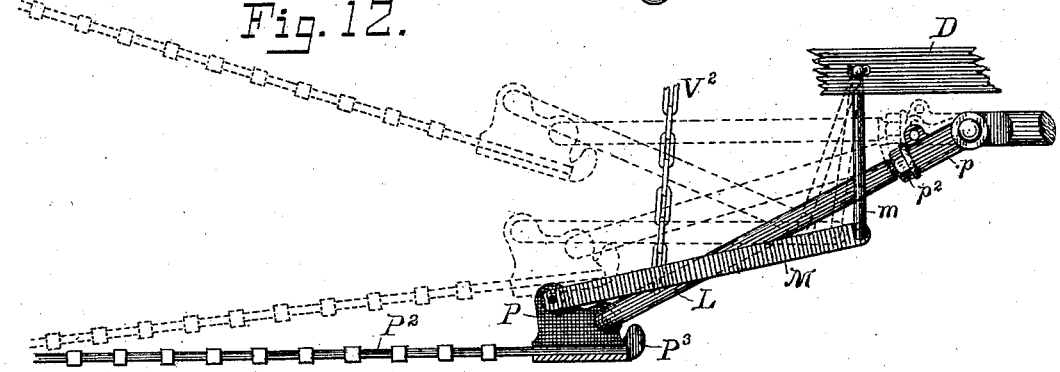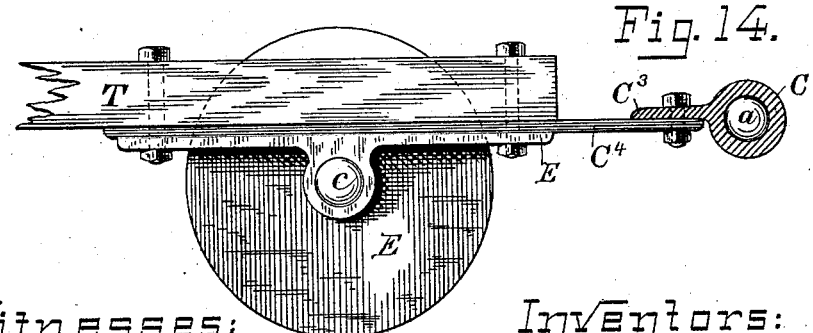

(No Model.) 6 Sheets—Sheet 6.
W. N. WHITELEY & W. BAYLEY.
MOWING MACHINE.
No. 378,816. Patented Feb. 28, 1888.

Witnesses:
Oscar E. Perrigo.
Fred State,

Inventors:
William N. Whitely.
William Bayley

UNITED STATES PATENT OFFICE.

WILLIAM N. WHITELEY AND WILLIAM BAYLEY, OF SPRINGFIELD, OHIO, ASSIGNORS TO THE TORONTO REAPER AND MOWER COMPANY, OF SAME PLACE.

MOWING-MACHINE.

SPECIFICATION forming part of Letters Patent No. 378,816, dated February 28, 1888.

Application filed November 24, 1886. Serial No. 219,792. (No model.)

*To all whom it may concern:*

Be it known that we, WILLIAM N. WHITELEY and WILLIAM BAYLEY, citizens of the United States, residing in Springfield, in the county of Clark and State of Ohio, have invented certain new and useful Improvements in Mowing-Machines, of which the following is such a full, clear, and exact description of the invention as will enable any person skilled in the art to which it applies to construct and use the same, reference being had to the accompanying drawings, forming a part of this specification.

Our invention relates to harvesters in general, and particularly to that class of machines known as "two-wheeled folding-bar chain-drive-gear mowing-machine;" and the objects of our invention are—

To so construct a main frame that the principal strains shall be borne by steel rods or bars, few in number and simple in form. For this purpose we place upon the main shaft two tubular bearings of sufficient length to fill the spaces between the main wheels and the center wheel, which drives the cutting apparatus. To one of these bearings we fix by a suitable connecting-plate the draft-tongue, which is braced to it by a flat steel bar which supports the cutting apparatus, and to the other by a brace of round steel, thus constructing the frame in triangular form.

To provide a simple and efficient device for tightening the driving-chain which transmits power from the sprocket-wheel fixed to the main shaft to the counter-shaft. Usually drive-chains are tightened by an "idle-wheel" capable of being adjusted so as to tighten the chain. We form upon the cover which protects the sprocket wheel and chain a projecting rounded surface bearing upon the chain, the said cover being made adjustable for the purpose of tightening the chain.

To so construct the devices for controlling the cutting apparatus that the latter may be securely connected to the main frame and draft-tongue of the machine and securely braced therewith, and at the same time entirely free and flexible to conform to the undulations of the ground over which it passes, and that the operator may have full control over the cutting apparatus to "tilt" the fingers up or down to raise the inner end of the cutting apparatus without the outer end, or to raise both ends, the outer end much higher than the inner end. This latter movement is obtained by the use of a short lever in addition to the usual brace-rod connection between the shoe and fly-wheel shaft, the lever being pivoted to the inner shoe at one end and its opposite end connected by a link to the main frame or draft-tongue of the machine, and so operates that in the act of lifting the cutting apparatus the short lever becomes locked, and in turn lifts the outer end of the cutting apparatus much higher than the inner end.

To so construct the "tilting" device as that the cutting apparatus may be easily "tilted" to any position required, and at the same time the joints whereby this movement is produced may not impair the rigidity of the connection of the cutting apparatus with the main frame. For this purpose we fix the drag-bar to the inner shoe and elevate or depress its front end by means of a swinging frame pivoted to a bracket fixed to the draft-tongue, moving in a plane transverse to said tongue, and operated by suitable mechanism.

The accompanying drawings illustrate a mowing-machine embodying our invention, in which drawings—

Figure 2:
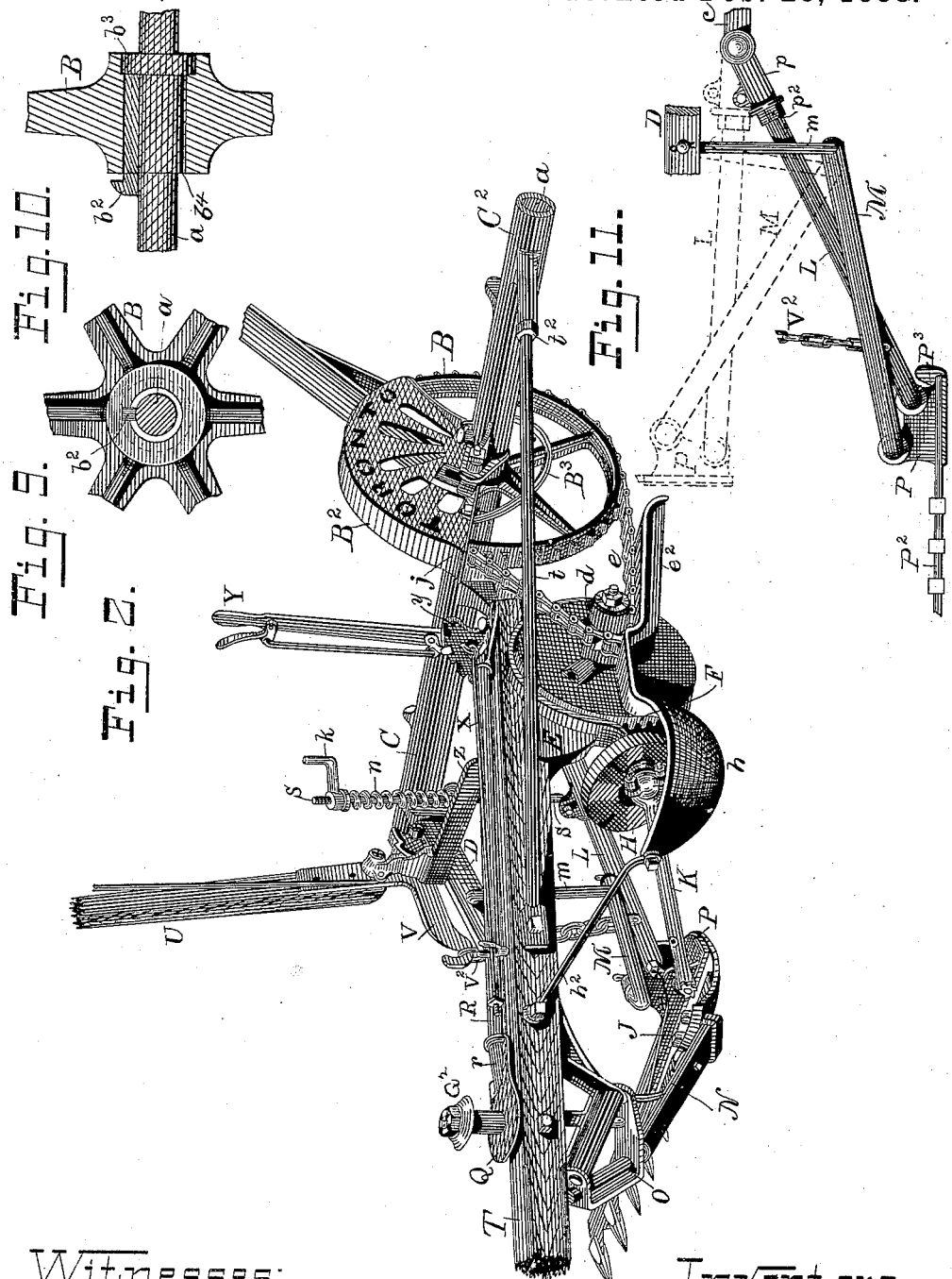
Figure 3:
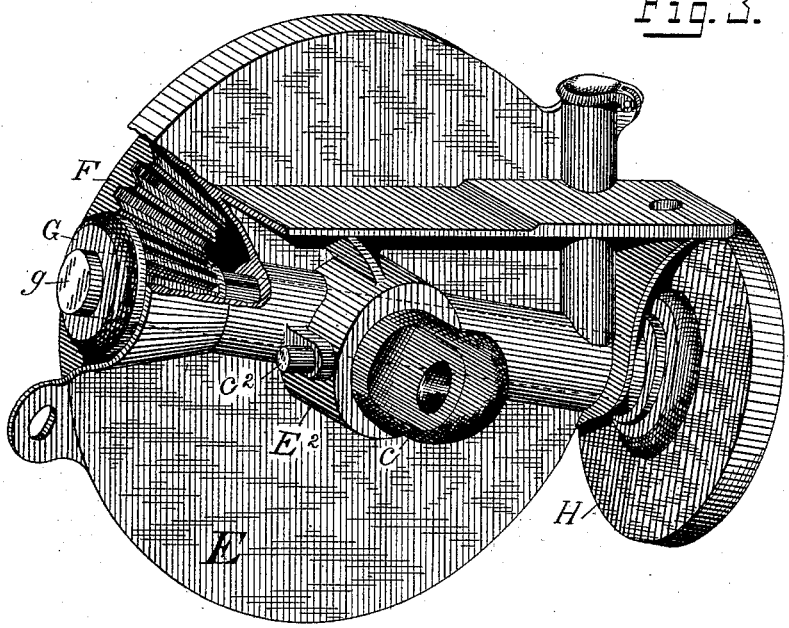
Figure 4:
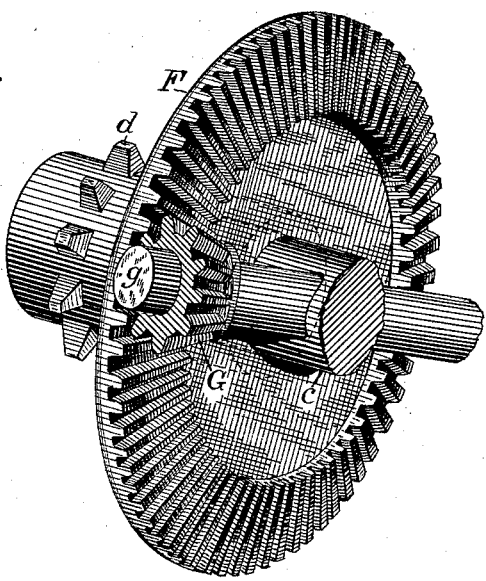
Figure 15:
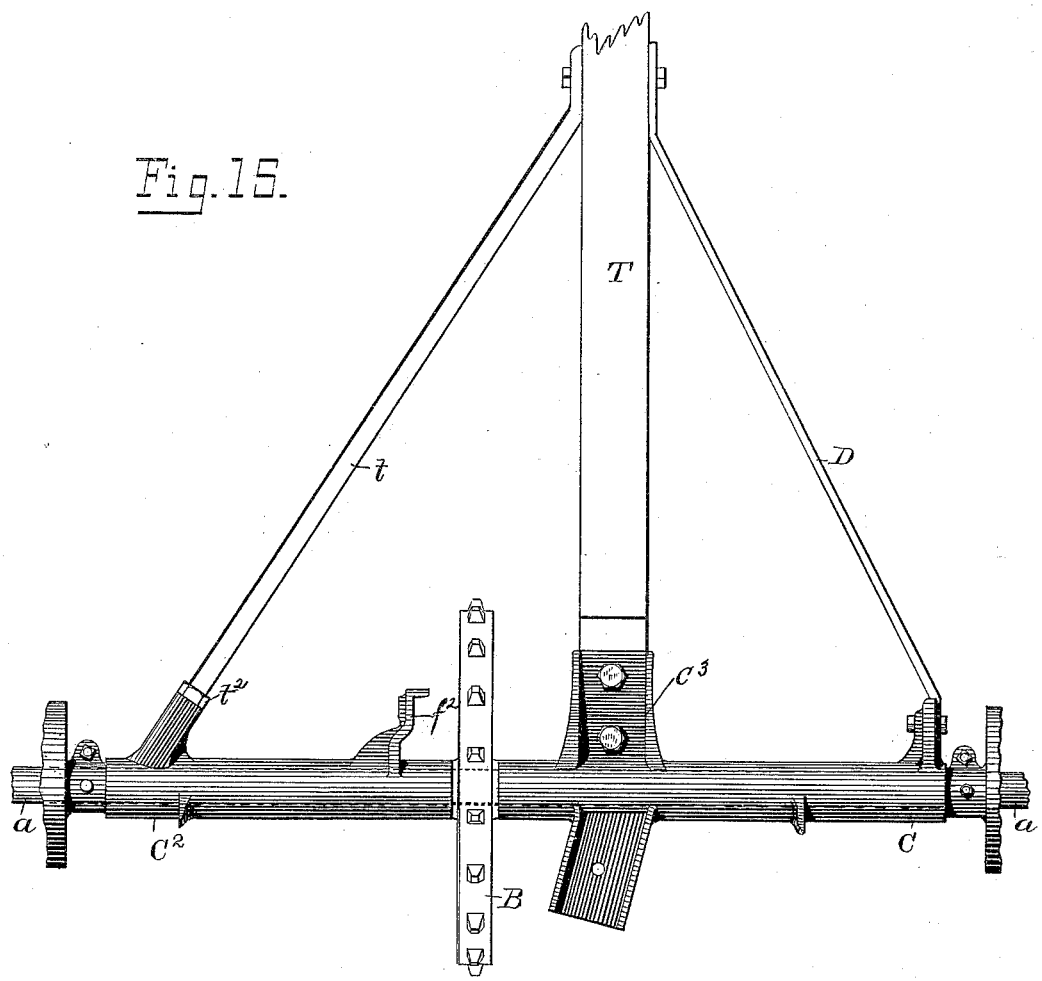

Figure 1 is a perspective view from the front right-hand side of the machine. Fig. 2 is a perspective view of the working parts of the machine from the front left-hand side. Fig. 3 is a perspective view of the bevel-gear case, showing the construction and arrangement of the crank-shaft and connection of the inner end of the connecting-bar. Fig. 4 is a view of the combined bevel and sprocket wheel and the bevel-pinion of the crank-shaft. Fig. 5 is a side elevation of the main sprocket-wheel on the main axle, the sprocket-pinion, chain, and sprocket-wheel case, showing the chain-tightening device. Fig. 6 is a side elevation of the drag-bar and its connection with the inner shoe, draft-tongue, and tilting device. Fig. 7 is a front elevation of the tilting device. Fig. 8 is a plan of the bracket which attaches the tilting device to the draft-tongue. Fig. 9 is a vertical section through the hub of the main sprocket-wheel, main axle, &c. Fig. 10 is a side elevation of the same; and Fig. 11 is a front elevation of the levers connecting the cutting apparatus with the main frame, showing their positions when the finger-bar is folded. Fig. 12 is a front elevation of the same levers, showing their positions when the cutting apparatus is elevated. Fig. 13 is a horizontal section through the fly-wheel shaft and adjacent parts; and Fig. 14 is a longitudinal section showing the method of attaching the draft-tongue, &c., to the main frame. Fig. 15 is a plan view of the main frame and tongue connection.

Similar letters refer to like parts in the several views.

The main driving-wheels A A are loosely journaled upon the main shaft $a$, and attached to or detached from it by the clutches $b$, or any convenient or well-known device used for that purpose. To the main axle or shaft $a$ the sprocket-wheel B is fixed, as shown in Figs. 9 and 10. The shaft $a$ is enlarged at $b^4$ sufficiently where it fits into the wheel B to allow a keyway to be cut for the key $b^2$ in the enlargement. Another shoulder, $b^3$, is formed, against which the wheel B is forced, thus insuring a true-running wheel.

Journaled upon the main shaft $a$ are the "pipe-boxes" C $C^2$, which occupy the spaces between the sprocket-wheel B and the clutches $b$ $b$.

Formed upon the pipe-box C (which forms a part of the main frame) is a lug, $C^3$, to which is fixed the connecting-plate $C^4$. The draft-tongue is fixed to the top of the plate $C^4$, and the gear-casing E (which covers the gears and furnishes bearings for their shafts) is fixed to the bottom, the parts being arranged as shown in Fig. 14, and said tongue is braced by the bar D, which also serves in part to support the cutting apparatus. From the pipe-box $C^2$ the draft-tongue T is braced by the tongue-brace $t$, which is made adjustable as to its length by the check-nut $t^2$.

The driver's seat W is fixed to the usual seat-spring, $W^2$, which is secured to a projection formed upon the pipe-box C in the usual manner.

Attached to the draft-tongue T by bolts passing through it and the plate $C^4$, and projecting downwardly therefrom, is the casting E, which forms a casing or cover for the combined bevel-gear and sprocket-pinion F and a support for the stud $c$, (upon which the wheel F is journaled,) as well as journal-boxes for the fly-wheel shaft $g$. The stud $c$ passes through the gear-casing E, and is rigidly secured thereto by the pin $c^2$. Upon one end of the stud $c$ is journaled the combined bevel-wheel and sprocket-pinion F, which is secured by a nut, as usual. The opposite end of the stud $c$ forms a half of the "ball-and-socket joint" of the inner end of the coupling-bar L. Formed upon the casing E are the journal-boxes $E^2$, in which the fly-wheel shaft $g$ is journaled, the shaft passing loosely through a hole in the stud $c$, and having fixed to one end the bevel-pinion G, engaging the bevel-wheel F, and upon the other the crank-wheel H, from the wrist-pin of which runs the pitman K to the cutter-bar J, in the usual manner. The construction and arrangement of this part of the driving-gearing are shown in Figs. 3 and 13.

The crank-wheel H and pitman-head are protected from grass and other clogging matter, as well as obstacles, by the shield $h$, which is braced by the rod $h^2$, running to the draft-tongue T.

The bevel-gear F is operated by the drive-chain $e$, running from the sprocket-wheel B to the sprocket-pinion $d$, formed upon the hub of the bevel-gear F.

The sprocket-wheel B is covered and protected by a casing, $B^2$, which is journaled on the pipe-box $C^2$ and turns loosely thereon, being confined to its place by the bolt $f$, (see Fig. 5,) which passes through a slot in the casing $B^2$ and a hole in the projection $f^2$, formed upon the pipe-box $C^2$. The lower portion of the sprocket-wheel B is protected from grass, sticks, &c., by the curved guard-rod $B^3$, fixed to the casing $B^2$. The casing $B^2$ is formed with an outwardly-curved portion, as seen at $j$, which bears upon the drive-chain $e$, acting as a "tightener," and adjusted by the bolt $f$, the casing $B^2$ turning on a center coincident with the center of the sprocket-wheel B.

The lower portion of the drive-chain $e$ is protected by the projection $e^2$, formed upon the fly-wheel shield $h$. (See Fig. 2.)

The cutting apparatus (i. e., the finger-bar $P^2$, the cutter-bar J, and the inner shoe, P, &c.) is connected to the machine by means of the coupling-bar L, the short lever M, and the drag-bar N. The bar L is connected at its inner end by a ball-and-socket joint, as above described, to the stud $c$, and at its outer end to the inner shoe, P, by a pivot-bolt, and is made adjustable as to its length by the screw-head $p$ and check-nut $p^2$.

The lever M is pivoted at its outer end to the inner shoe, P, and at its inner end pivoted to and supported by the link $m$, the upper end of which is pivoted to the bar D. The drag-bar N is fixed to the inner shoe, P, and, projecting forward and upward, is pivoted to a swinging frame, O, which in turn is pivoted to the whiffletree frame or support Q, which is fixed to the draft-tongue T and has fixed to it an upwardly-projecting stud, $Q^2$, upon which the whiffletrees are pivoted.

The function of the swinging frame Q is to raise and lower the forward end of the drag-bar N, and hence to tilt the points of the guards or fingers up and down, the movements of these parts being controlled by the rock-shaft R, mounted at its front end in a suitable projection on the top of the whiffletree-frame Q, and having formed upon it a crank, $r$, which is connected to the swinging frame O by the link $l$. The rock-shaft R lies parallel to the draft-tongue T, and its rear end is mounted in the segment-bracket $y$, also fixed to the draft-tongue T, and having notches formed in it for the latch of the tilting lever Y, which is fixed to the rear end of the rock-shaft R.

The cutting apparatus is elevated by the elevating-lever U, which is pivoted to the bracket $u$, fixed to the bar D, and upon the top of which are formed notches, into which the usual latch engages for sustaining the cutting apparatus at any desired height, the parts being arranged as shown in Fig. 1. Upon the lower end of the elevating-lever U is formed the right-angled lever V, provided with a hook, from which the elevating-chain $V^2$ descends to the coupling-bar L, to which it is attached.

When it is desired to elevate the cutting apparatus, the lever U is pulled backward, and the bar L is thereby raised, moving on its connection with the frame as a center and lifting the inner shoe, to which its free end is pivoted. The lever M, being pivoted at one end to the inner shoe and at the other end to the swinging link $m$, does not influence the lifting of the inner end of the cutting apparatus until it engages the stud projection $P^3$, formed on the top of said shoe, when said lever M becomes for the time being a rigid prolongation of the cutting apparatus, having a movable fulcrum-point at its extremity in the link $m$. Up to this point the inner end of the cutting apparatus is lifted without lifting the outer end; but when the lever M becomes locked to the inner shoe, this inner end being prevented from rising by the movable fulcrum-link $m$, it follows that the outer end of the cutting apparatus will rise faster than the inner shoe. These positions and the action of the parts involved are shown in Fig. 12.

When it is desired to fold the cutting apparatus to a vertical position for transportation, it is elevated by the lever U to the proper position, and, having been locked in that position by the latch on the lever U, as usual, the finger-bar is folded to a vertical position, the parts taking the positions shown in Fig. 11, and retained there by a brace-rod which is connected to the draft-tongue T by an eyebolt. The opposite end passes through a hole in the finger-bar $P^2$ and is secured by a nut, the brace then standing at an angle of about forty-five degrees.

Pivoted to the connecting-bar L is an upwardly-projecting rod, S, which passes through a bracket fixed to the brace Z, above which is a spiral spring, $n$. The upper portion of the rod S is threaded, and upon it is fitted the crank-nut $k$. The object of this device is to partially support the cutting apparatus, the tension of the spring $n$ being regulated by the crank $k$, whereby the cutting apparatus is carried more lightly upon the ground, most of its weight being thus transferred to the main frame of the machine, and is much more easily elevated when necessary.

Having thus described the construction, arrangement, and operation of our invention and pointed out wherein it differs from the usual devices employed for similar purposes, and without wishing to be understood as restricting our claims of invention to the precise form or proportion of parts or to any particular devices not essential to the principles of construction and mode of operation herein described, what we claim, and desire to secure by Letters Patent, is—

1. In a harvester, a main frame composed of a tongue and two tubular journal-boxes, C $C^2$, for the main shaft, provided with lugs for attachment of said tongue, and the side braces, D $t$, forming a triangular frame, and the lug $f^2$, for attachment of the shield $B^2$, combined with said shield $B^2$ and the sprocket-wheel B, substantially in the manner and for the purpose shown and described.

2. In a harvester employing a drive-chain for transmitting power from the main axle to the cutting apparatus, or to operative parts connected therewith, an adjustable gear-cover, one portion of which is adapted to bear upon the chain to tighten the same, substantially in the manner shown and described.

3. In a harvester, a cutting apparatus, two parallel brace-levers, one of which is jointed at one end to the inner shoe of said cutting apparatus and at the other end to the main frame, or some fixed part thereof, and the other lever jointed to the inner shoe at one end and at the other end pivoted to a link dependent from and pivoted to the main frame, or some fixed part thereof, in combination with a suitable hand-lever mounted on the frame and its connections for lifting said brace-levers and the cutting apparatus, substantially in the manner and for the purposes shown and described.

4. In a harvester, a device for tilting or elevating or depressing the points of the fingers of the cutting apparatus, consisting of a drag-bar fixed to the inner shoe and extending forward and upward, and pivoted to the outer extremity of a swinging frame mounted upon a pivot parallel with the draft-tongue, or some fixed part thereof, in combination with a suitable hand-lever and connecting mechanism for operating the same, substantially in the manner shown and described, and for the purposes set forth.

5. In a harvesting-machine, a whiffletree frame or support rigidly attached to and extending downward from the draft-tongue, combined with the frame O, mounted upon a pivot parallel with said tongue, the drag-bar, and means for swinging said frame O to tilt the guard-fingers, substantially in the manner and for the purpose shown and described.

6. In combination, in a mowing-machine, a rock-shaft arranged parallel with the tongue and provided with a controlling hand-lever, a tilting frame, O, mounted upon a pivot parallel with the tongue and attached to the cranked end of said rock-shaft by a suitable device, and the drag-bar jointed at its front end to said tilting frame for the purpose of raising and lowering the points of the fingers, substantially in the manner shown and described.

WILLIAM N. WHITELEY.
WILLIAM BAYLEY.

Witnesses:
OSCAR E. PERRIGO,
FRED STATE.